(12) United States Patent
Yuhan et al.

(10) Patent No.: US 9,396,259 B1
(45) Date of Patent: *Jul. 19, 2016

(54) CAPTURE OF WEB APPLICATION STATE

(75) Inventors: John S. Yuhan, Lynnwood, WA (US); Ross V. Korsky, Auburn, WA (US)

(73) Assignee: Amazon Technologies, Inc., Seattle, WA (US)

(*) Notice: Subject to any disclaimer, the term of this patent is extended or adjusted under 35 U.S.C. 154(b) by 1128 days.

This patent is subject to a terminal disclaimer.

(21) Appl. No.: 13/449,627

(22) Filed: Apr. 18, 2012

(51) Int. Cl.
*G06F 17/30* (2006.01)
*H04L 12/24* (2006.01)

(52) U.S. Cl.
CPC ...... *G06F 17/30861* (2013.01); *H04L 41/0253* (2013.01)

(58) Field of Classification Search
None
See application file for complete search history.

(56) References Cited

U.S. PATENT DOCUMENTS

| | | | |
|---|---|---|---|
| 2004/0049673 A1* | 3/2004 | Song et al. | 713/150 |
| 2005/0177597 A1* | 8/2005 | Elmer | 707/104.1 |
| 2005/0228621 A1* | 10/2005 | Matsuo et al. | 703/1 |
| 2012/0173966 A1* | 7/2012 | Powell et al. | 715/234 |
| 2013/0004087 A1 | 1/2013 | Kumar et al. | |

OTHER PUBLICATIONS

File history of U.S. Appl. No. 13/449,620, filed Apr. 18, 2012. (copy not provided).

* cited by examiner

*Primary Examiner* — Angela Nguyen
(74) *Attorney, Agent, or Firm* — Thomas | Horstemeyer, LLP

(57) ABSTRACT

Disclosed are various embodiments of a system for rendering, in a first browser of a computer, a network page of an electronic commerce system. The system stores, in a first data store, a first capture of a rendering of the network page. The system transmits data associated with the first capture to another computer, where a second browser renders the network page based at least upon the data associated with the first capture. The system stores, in a second data store, a second capture of the network page.

20 Claims, 8 Drawing Sheets

CAPTURE OF WEB APPLICATION STATE

BACKGROUND

Browser applications may render the network pages of an electronic commerce system or other network site to have an appearance that differs depending upon the particular browser used. Furthermore, a given browser may render a network page differently based upon changes made to the network page.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to techniques for capturing and validating the appearance of network pages. For example, a given network page may have a different appearance based upon the browser application used to render the network page, or a given browser may change the appearance of a network page after an update to the page. In order to validate the appearance of different versions of network pages in various browsers, captures must be taken of renderings of the network pages by these various browsers at different points in time. Each of the captures may include various data about the rendering of the network page and the communication session with the electronic commerce system or other network page server. Various client computers, each using different browsers, may be used to perform a capture of a network page or a sequence of network pages that may be stored in a data store for later validation.

A capture differential engine may be used to compare captures of network pages in order to validate that their appearance is consistent across different browsers and/or changes to the network pages. The capture differential engine may examine attributes of the various captures to ensure that the network pages represented in a given pair of captures are suitable for comparison. The attributes of a pair of captures need not be identical to be suitable for comparison, rather the attributes may be correlated to determine a sufficient degree of similarity. In the following discussion, a general description of the system and its components is provided, followed by a discussion of the operation of the same.

Figure 1A:
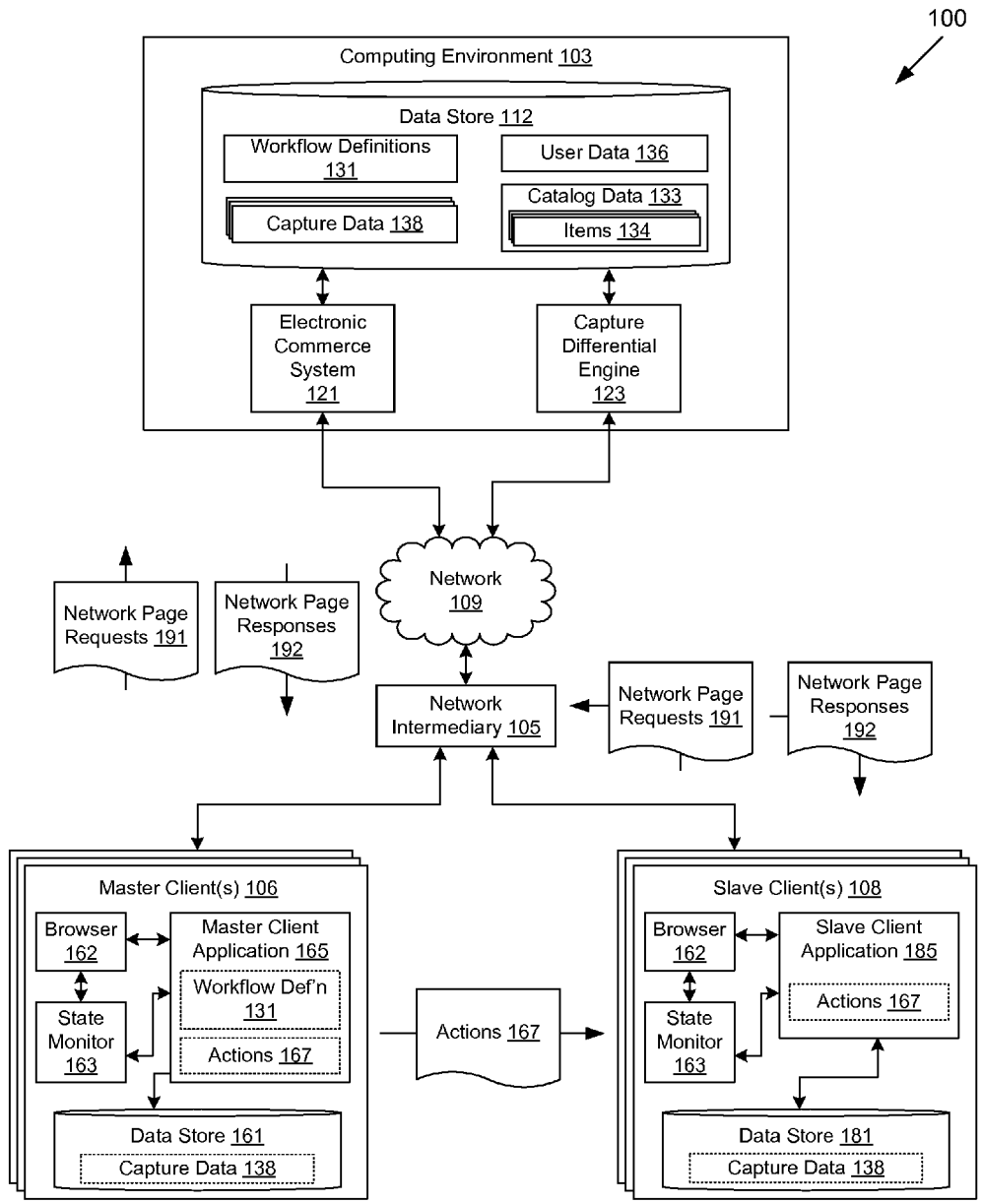
FIGS. 1A and 1B are drawings of a networked environment according to various embodiments of the present disclosure.

With reference to FIG. 1A, shown is a networked environment 100 according to various embodiments. The networked environment 100 includes a computing environment 103 in data communication with a network intermediary 105, one or more master clients 106, and one or more slave clients 108 by way of a network 109. The network intermediary 105 may cache communications between master clients 106 and the computing environment 103 to be reproduced for the slave clients 108. The network 109 includes, for example, the Internet, intranets, extranets, wide area networks (WANs), local area networks (LANs), wired networks, wireless networks, or other suitable networks, etc., or any combination of two or more such networks. In some embodiments, the network intermediary 105, master clients 106, and/or the slave clients 108 may be virtual machines executed in the computing environment 103 or other computing device.

The computing environment 103 may comprise, for example, a server computer or any other system providing computing capability. Alternatively, the computing environment 103 may comprise a plurality of servers or other computing devices that are arranged, for example, in one or more server banks or computer banks or other arrangements. For example, the computing environment 103 may comprise a cloud computing resource, a grid computing resource, and/or any other distributed computing arrangement. The computing environment 103 may be located in a single installation or may be distributed among many different geographical locations.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include an electronic commerce system 121, a capture differential engine 123, and other applications, services, processes, systems, engines, or functionality not discussed in detail herein. The electronic commerce system 121 is executed in order to facilitate the online purchase of items from one or more electronic marketplaces over the network 109. The electronic commerce system 121 also performs various backend functions associated with the online presence of an electronic marketplace in order to facilitate the online purchase of items. For example, the electronic commerce system 121 may generate content pages such as, for example, web pages and/or other types of network content that are provided to clients 106 for the purposes of promoting and selecting items for purchase, rental, download, lease, or any other forms of consumption.

The capture differential engine 123 is executed to identify differences among captures of network pages. To this end, the capture differential engine 123 may use the captures, user data, catalog data, and/or other data from the data store 112. In order for a user to identify the particular captures to be compared, the capture differential engine 123 may render a display on a client over the network 109 by a browser, a client application, and/or other application.

The data stored in the data store 112 includes, for example, workflow definitions 131, catalog data 133, user data 136, captures 138, and potentially other data. The workflow definitions 131 define the activities, actions, and/or steps to be carried out in order to automate all or a portion of the capture of one or more network pages. In some embodiments, the workflow definitions 131 may be expressed using functional logic as may be expressed, for example, in terms of programmed code. In other embodiments, the workflow definition 131 may be expressed using, for example, extensible markup language (XML), Business Process Execution Language (BPEL), XML Process Definition Language (XPDL), or other such languages.

The catalog data 133 may include items 134 that are offered in the marketplace of the electronic commerce system 121, as well as other information associated with the items 134. The various data stored in catalog data 133 may include, for example, titles, descriptions, classifications, quantities, conditions, images, options, weights, customer reviews, customer ratings, keywords, prices, promotions, shipping configuration, tax configuration, unique identifiers, and any other data related to items 134. An item 134 may refer to a product, good, service, software download, multimedia download, supply chain, or any combination, bundle, or package thereof, that may be offered for sale, purchase, rental, lease, download, and/or any other form of consumption and/or acquisition as may be appreciated.

The capture data 138 includes various data about the rendering of network pages by various browser applications and the communication sessions through which the network pages are delivered from the electronic commerce system 121 to the clients. Each capture may include a screenshot of the rendered network page, the document object model (DOM) tree created for the network page by a browser, various attributes associated with the communication session, and/or other possible data associated with the network page. Each capture may further include data associated with the DOM tree, such as relative positions of the elements of the DOM tree, coordinates for positioning the elements, and/or other data associated with the DOM tree. The attributes may include a user login state, a browser identifier, a uniform resource identifier (URI), a version identifier for the network page, and/or other attributes associated with the communication session. The captures may be organized into albums that present a sequence of captures representing all or a portion of the sequence of network pages encountered during a communication session.

The master client 106 is representative of a plurality of master client devices that may be coupled to the network 109. The master client 106 may comprise, for example, a processor-based system such as a computer system. Such a computer system may be embodied in the form of a desktop computer, a laptop computer, a tablet computer system, or other devices with like capability. Various applications and/or other functionality may be executed in the master client 106 according to various embodiments. Also, various data is stored in a data store 161 that is accessible to the master client 106. The data store 161 may be representative of a plurality of data stores 161 as can be appreciated. The data stored in the data store 161, for example, is associated with the operation of the various applications and/or functional entities described below.

The master client 106 may be configured to execute various applications such as a browser 162, state monitor 163, master client application 165, and/or other applications. The browser 162 may be executed in a master client 106, for example, to access and render network pages, such as web pages, or other network content served up by the computing environment 103 and/or other servers. The state monitor 163 may be executed to monitor and report various state data associated with a communication session between the browser 162 and the electronic commerce system 121.

The master client application 165 may be executed to capture a rendering of a network page by the browser 162 and attributes associated with the communication session between the browser 162 and the electronic commerce system 121. In addition, the master client application 165 translates the activities of the browser 162 and the activities undertaken to capture renderings of select ones of the network pages into actions 167. The actions 167 represent an intermediate form of the various activities that permit a slave client using any type of browser 162 to duplicate the activities of the master client associated with capturing a network page.

The slave client 108 is representative of a plurality of slave client devices that may be coupled to the network 109. The slave client 108 may comprise, for example, a processor-based system such as a computer system. Such a computer system may be embodied in the form of a desktop computer, a laptop computer, a tablet computer system, or other devices with like capability. Various applications and/or other functionality may be executed in the slave client 108 according to various embodiments. Also, various data is stored in a data store 181 that is accessible to the slave client 108. The data store 181 may be representative of a plurality of data stores as can be appreciated. The data stored in the data store 181, for example, is associated with the operation of the various applications and/or functional entities described below.

The slave client 108 may be configured to execute various applications such as a browser 162, state monitor 163, slave client application 185, and/or other applications. The slave client application 185 may be executed to capture a rendering of a network page by the browser 162 and attributes associated with the communication session between the browser 162 and the electronic commerce system 121. In addition, the slave client application 185 may obtain and act upon actions 167 from a master client 106, as well as transmit stored captures 138 to a master client 106 and/or other computing device.

Next, a general description of the operation of the various components of the networked environment 100 is provided. To begin, the browser 162 of the master client 106 issues a network page request 191 for a network page of the electronic commerce system 121. In some embodiments, a user directs the browser 162 to the network page. In other embodiments, the master client application 165 executes a workflow definition 131 that directs the browser 162 to the network page.

The network page request 191 passes through the network intermediary 105 prior to being forwarded to the computing environment 103. The network intermediary 105 is configured with the identity of one or more master clients 106 and one or more slave clients 108 associated with each of the master clients 106. The network intermediary 105 caches any network page request 191 from the master client 106 for a network page of the electronic commerce system 121, as well as the associated network page response 192 to the request from the electronic commerce system 121.

As the browser 162 is directed to carry out various activities, such as issuing network page requests 191, the activities are translated into actions 167. The actions 167 may be communicated to the slave clients 108 and enable the slave clients 108 to issue network page requests 191 that masquerade as network page requests 191 from duplicate of the associated master client 106. The masquerading techniques may involve manipulating network addresses, duplicating browser session cookies, and/or other techniques as can be appreciated. Thus, if a network page request 191 is received from a slave client 108 matching attributes of a network page request 191 previously received from a master client 106, the slave client 108 will receive the network page response 192 previously cached by the network intermediary 105. In this scenario, the network page request 191 sent by the slave client 108 destined for the computing environment 103 will not be forwarded to the destination, and the network page response 192 will be sent by network intermediary 105 masquerading as the computing environment 103.

A portion of the network pages rendered in the clients may be selected for capture. In some embodiments, the master client application 165 executes the workflow definition 131 containing various criteria for capturing a given one of the network pages. As a non-limiting example, the workflow definition 131 may contain a sequence of network pages to render, wherein a given network page may contain criteria to capture the page if the network page is a page for an item containing more than fifty user reviews. The state of the session between the browser 162 and the electronic commerce system 121 may be monitored by the state monitor 163 and may be used to identify the present state of various attributes of the session, including attributes that may be criteria for capturing a network page.

The state of the attributes may be reported to the master client application 165. In embodiments of the master client application 165 executing the workflow definition 131, the master client application 165 may use the values of the attributes to automatically select the network pages to be captured and stored in the capture data 138 of the data store 161. In other embodiments, a user may manually select the network pages to be captured and stored in the capture data 138 of the data store 161 based upon the values of the attributes and/or other criteria as can be appreciated.

For the network pages selected for capture in the master client 106, various data for each of the network pages may be stored in the capture data 138 such as, for example, a screen capture of the network page as rendered in the browser 162, a DOM tree as created from the network page by the browser 162, data associated with placement of the elements of the DOM tree, various attributes of the network page session as reported by the state monitor 163, and/or other data associated with the network page. The master client application 165 further translates the capture activities of the master client 106 into actions 167 that are communicated to the slave clients 108. As a consequence of translating the browsing and capture activities of the master client 106 into actions for the slave client(s) 108, the same network page data is rendered and captured by the associated clients, albeit using the rendering of a browser 162 that may be unique to each client.

Upon termination of a browsing session in a workflow definition 131 or by direction from a user, the master client application 165 may collect the captures 138 from each slave client 108. The captures from the master client 106 and the slave clients 108 associated with the master client 106 may be transmitted to the master client 106 and/or computing environment 103 for further analysis and processing.

To this end, the capture differential engine 123 obtains various criteria with which to select and compare captures. The specified criteria may be compared against the attributes for each of the captures as collected by the clients such as, for example, user login state, time of rendering, the URI of the network page, a product identifier of a product in the network page, type of browser used for the rendering, and/or other attributes as can be appreciated. As a non-limiting example, the criteria may be highly specific such as compare a capture of page X taken on Monday with another capture of page X taken by the same client using the same browser 162 on Tuesday. Alternatively, the criteria may be generalized such as, for example, compare all similar captures taken within two specific capture sessions.

Upon identifying a pair of captures to be compared, the capture differential engine 123 may compare the captures using various techniques such as, for example, comparing images of the renderings by performing a pixel-by-pixel comparison identifying the locations in which the pixels of the image differ, a mean squares comparison of the images, and/or other image similarity techniques. The pixel comparison may be further adapted to compare only sub-regions of a rendered page rather than the entirety of the page. As another example, the captures may be compared by measuring differences in the dimensions of the DOM tree created for each capture by a respective browser 162. As a further example, images of the captures may be compared by one or more users who are then asked to identify the degree of similarity between the images. Furthermore, one or more of these techniques may be combined and the results weighted to generate a differential reflecting the degree of similarity among each pair of captures. Captures having a differential beyond a threshold value may trigger a notification of a potential problem with the respective network pages.

Figure 1B:
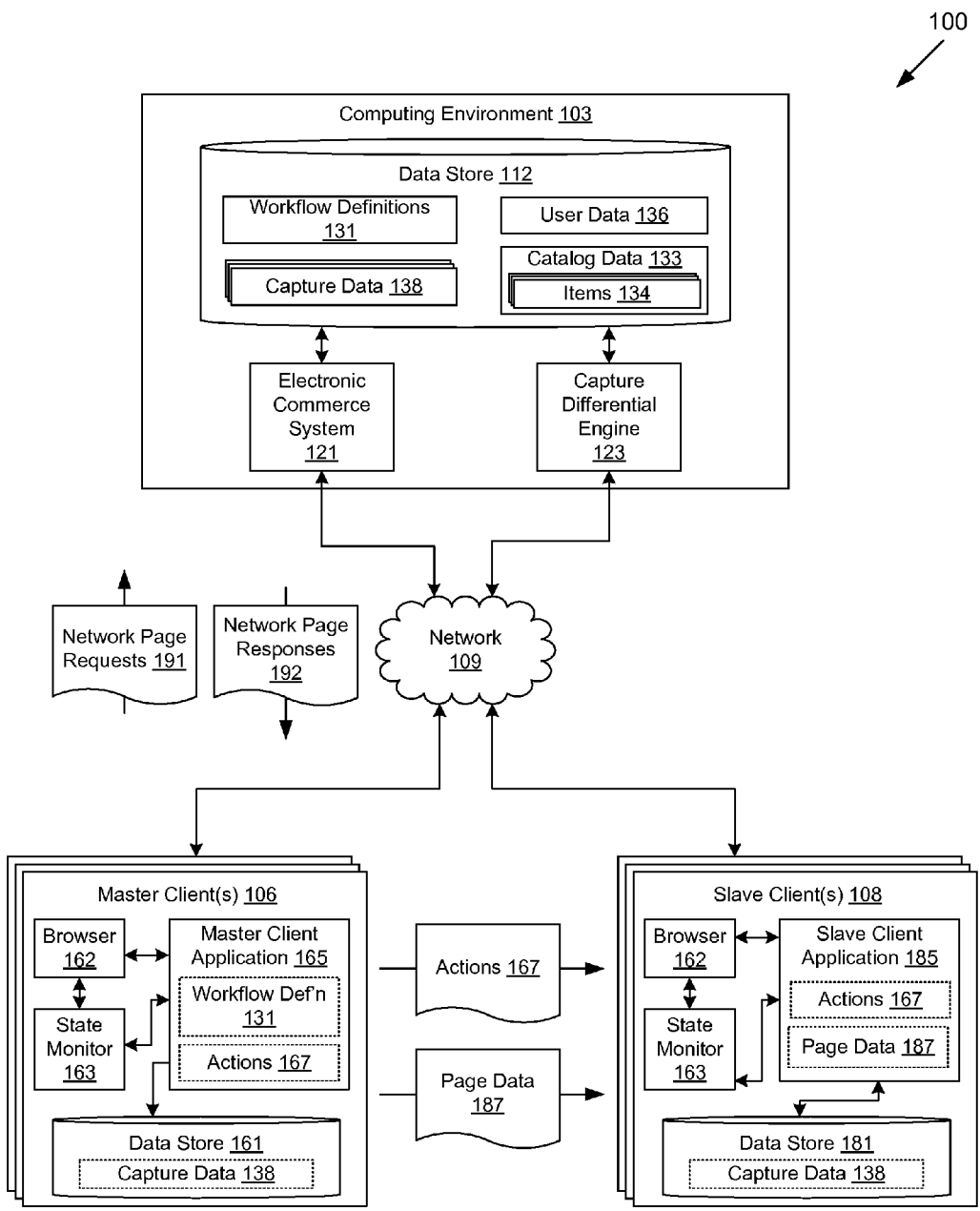

Referring next to FIG. 1B, shown is another embodiment of the networked environment 100. This embodiment of the networked environment 100 differs from FIG. 1A due to the removal of the network intermediary 105 and the addition of page data 187. The page data 187 includes at least a DOM tree as created by the browser 162 of the master client 106 and may further include other components of the network page such as images, videos, other network pages, and/or other data necessary to render the network page in the slave client 108.

The operation of this embodiment of the networked environment 100 differs in the techniques used by the slave client 108 to retrieve the network pages as directed by the master client 106. In this embodiment, the master client 106 provides the slave client 108 with page data 187 in addition to the actions 167. Some components of the network page may not be provided in the page data 187 and may need to be retrieved from the electronic commerce system 121 or other source by the slave client 108. In some embodiments, the master client 106 provides the slave client 108 with page data 187 without the actions 167. In these embodiments, the slave client 108 may capture all or a portion of the network pages rendered from the page data 187.

Figure 2A:
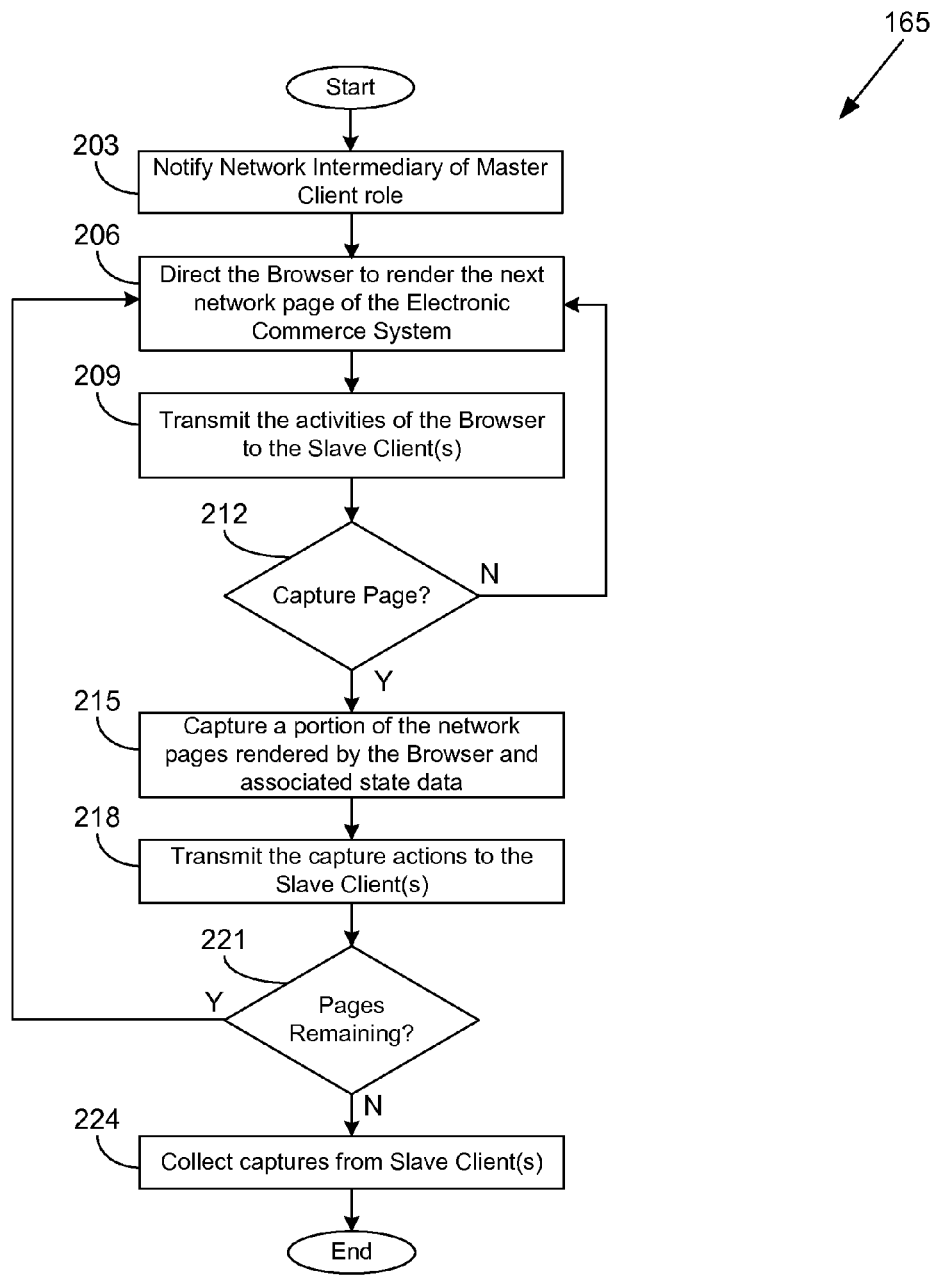
FIGS. 2A and 2B are flowcharts illustrating examples of functionality implemented as portions of a master client application executed in a master client in the networked environments of FIGS. 1A and 1B according to various embodiments of the present disclosure.

Turning now to FIG. 2A, shown is a flowchart that provides one example of the operation of a portion of the master client application 165 according to various embodiments. It is understood that the flowchart of FIG. 2A provides merely an example of the many different types of functional arrangements that may be employed to implement the operation of the portion of the master client application 165 as described herein. As an alternative, the flowchart of FIG. 2A may be viewed as depicting an example of steps of a method implemented in the master client 106 (FIG. 1A) according to one or more embodiments.

Beginning with box 203, the master client application 165 may notify the network intermediary 105 (FIG. 1A) of the master client role of the master client 106, and potentially the identity of the slave client(s) 108 (FIG. 1A) associated with the master client 106. Next, in box 206, the master client application 165 may direct the browser 162 (FIG. 1A) to render a network page of the electronic commerce system 121 (FIG. 1A) based upon a workflow definition 131 (FIG. 1A).

Then, in box 209, the master client application 165 translates the activities of the browser 162 into actions 167 (FIG. 1A) and transmits the actions 167 to the slave client(s) 108 of the master client 106. The actions 167 transmitted may further contain browser session cookies and/or other data sufficient to duplicate the communication session between the master client 106 and the electronic commerce system 121 within each of the slave clients 108. Subsequently, in box 212, the master client application 165 determines whether the currently rendered network page of the master client 106 should be captured. As discussed previously, the capture decision may be based upon attributes of the network page and capture criteria of a workflow definition 131, or the capture decision may be made by an operator of the master client 106. If the network page should not be captured, execution of the master client application 165 may return to box 206. Alternatively, if the network page should be captured, execution of the master client application 165 proceeds to box 215.

In box 215, the master client application 165 may store various data associated with the network page in the capture data 138 (FIG. 1A). The capture data 138 may include, for example, a screen capture of the network page as rendered in the browser 162, a DOM tree as created from the network page by the browser 162, data associated with placement of the elements of the DOM tree, various attributes of the network page session as reported by the state monitor 163 (FIG. 1A), and/or other data associated with the network page. Next, in box 218, the master client application 165 translates the capture activities of the master client 106 into actions 167 that are transmitted to the slave clients 108. Transmitting the actions 167 to the slave clients 108 permits the same network page data to be rendered and captured by the all the associated clients, while using the rendering of a browser 162 that may be unique to each client.

Then, in box 221, the master client application 165 determines if any further pages remain to be rendered. The determination may be known if no further pages remain in a workflow definition 131 or if the operator of the master client 106 determines the browsing session is complete. If additional pages remain to be rendered, execution of the master client application 165 returns to box 206. Alternatively, if the browsing session is complete, execution of the master client application 165 proceeds to box 224. In box 224, the master client application 165 collects the captures from each of the slave clients 108 using the file transfer protocol (FTP), hypertext transfer protocol (HTTP), and/or other data transfer protocols as can be appreciated. Thereafter, this portion of the master client application 165 ends as shown.

Figure 2B:
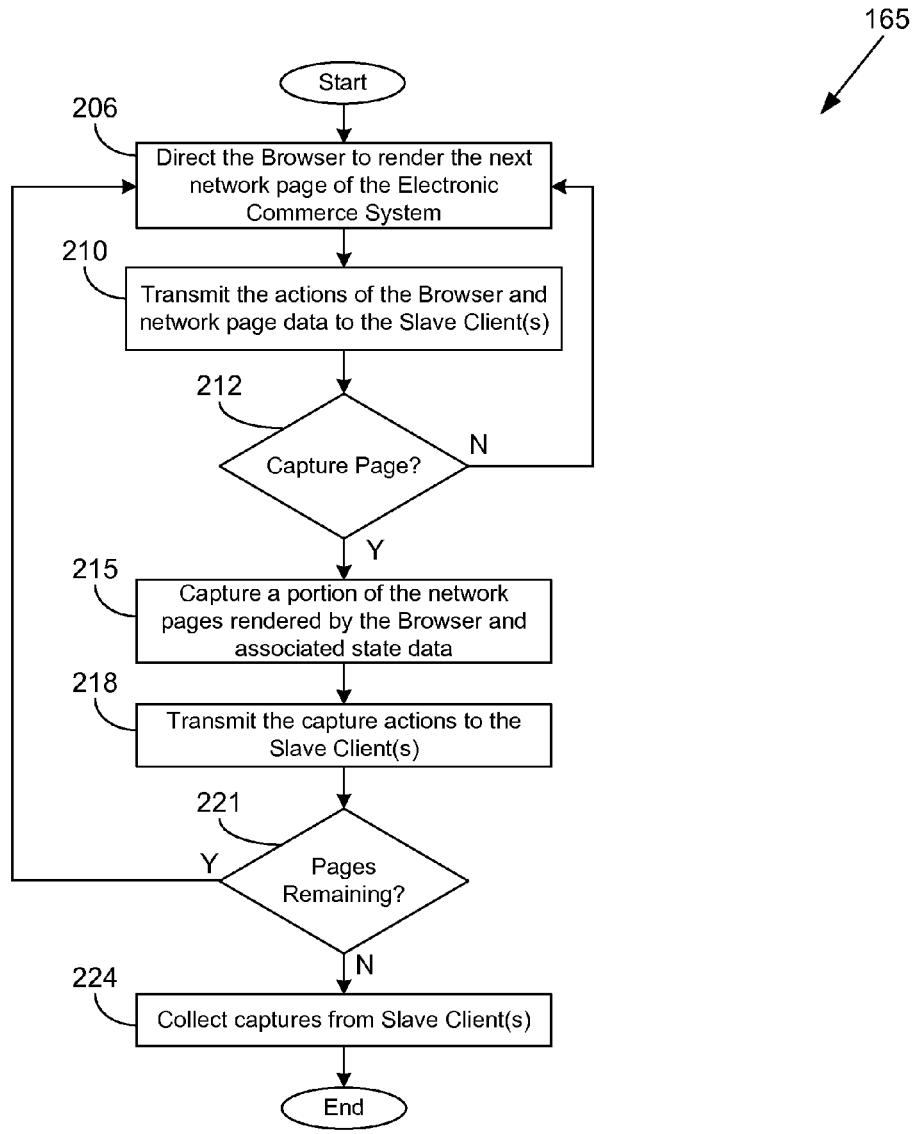

Referring now to FIG. 2B, shown is a flowchart that provides another example of the operation of a portion of the master client application 165 according to various embodiments. The flowchart of FIG. 2B resembles FIG. 2A with the exception that box 203 is removed and box 209 has been replaced with box 210. In box 210, the master client application 165 translates the activities of the browser 162 (FIG. 1A) into actions 167 (FIG. 1A) and transmits the actions to the slave client(s) 108 (FIG. 1A) of the master client 106 (FIG. 1A). The actions transmitted may further contain a DOM tree created from the network page by the browser 162, browser cookies and/or other data sufficient to duplicate the communication session between the master client 106 and the electronic commerce system 121 (FIG. 1A) within each of the slave clients 108. The page data transferred to the slave clients 108 should be sufficient to permit each slave client 108 to render the network page within the local browser 162 without modifying the state of the communication session established by the master client 106.

Figure 3A:
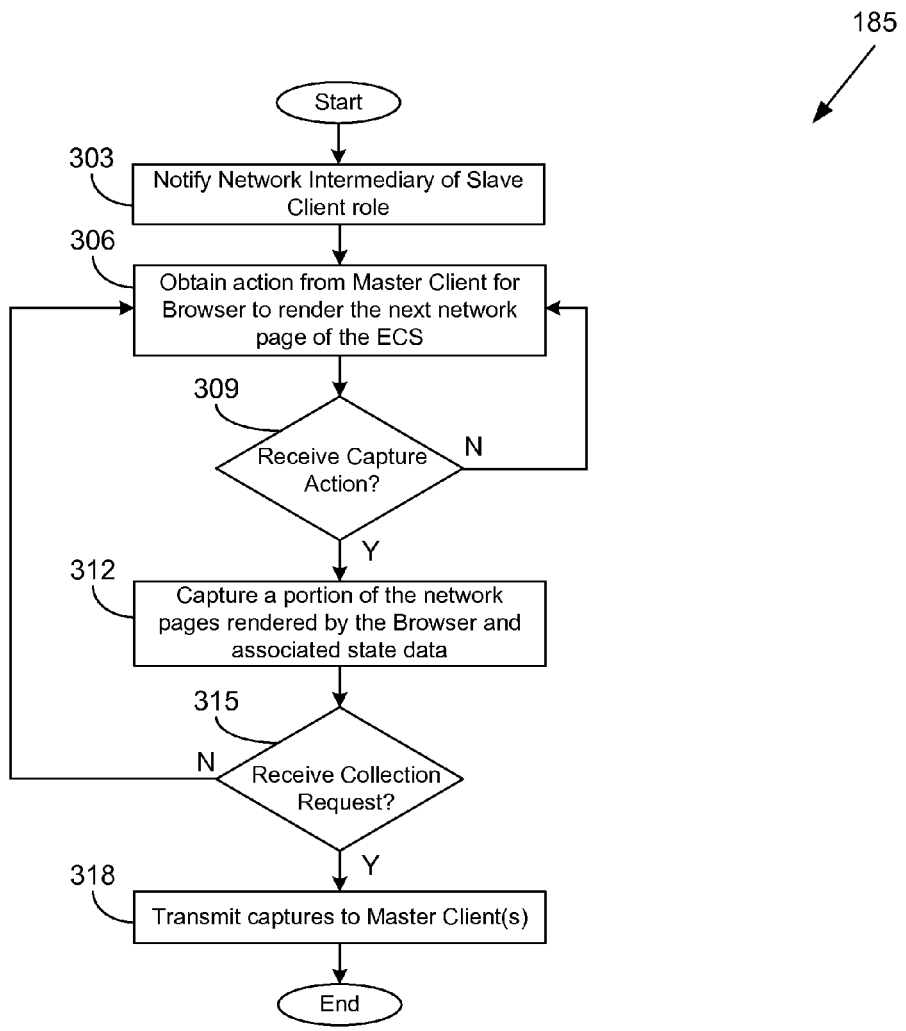
FIGS. 3A and 3B are flowcharts illustrating examples of functionality implemented as portions of a slave client application executed in a slave client in the networked environments of FIGS. 1A and 1B according to various embodiments of the present disclosure.

Moving on to FIG. 3A, shown is a flowchart that provides one example of the operation of a portion of the slave client application 185 according to various embodiments. It is understood that the flowchart of FIG. 3A provides merely an example of the many different types of functional arrangements that may be employed to implement the operation of the portion of the slave client application 185 as described herein. As an alternative, the flowchart of FIG. 3A may be viewed as depicting an example of steps of a method implemented in the slave client 108 (FIG. 1A) according to one or more embodiments.

Beginning with box 303, the slave client application 185 may notify the network intermediary 105 (FIG. 1A) of the slave client role of the slave client 108 (FIG. 1A), and potentially the identity of the master client 106 (FIG. 1A) associated with the slave client 108. Next, in box 306, the slave client application 185 may obtain an action 167 (FIG. 1A) from the master client 106. The action may contain a URI, browser cookies, and/or other data associated with duplicating the browsing session of the master client 106 in the slave client 108. To this end, the slave client application 185 may direct the browser 162 (FIG. 1A) to render a network page of the electronic commerce system 121 (FIG. 1A) using the data provided in the action 167.

Subsequently, in box 309, the slave client application 185 determines whether a capture action 167 was received for the currently rendered network page of the slave client 108. If a capture action 167 is not received, execution of the slave client application 185 may return to box 306. Alternatively, if the page should be captured, execution of the slave client application 185 proceeds to box 312. In box 312, the slave client application 185 may store various data associated with the network page in the capture data 138 (FIG. 1A). The capture data 138 may include, for example, a screen capture of the network page as rendered in the browser 162, a DOM tree as created from the network page by the browser 162, data associated with placement of the elements of the DOM tree, various attributes of the network page session as reported by the state monitor 163 (FIG. 1A), and/or other data associated with the network page.

Then, in box 315, the slave client application 185 determines if a collection request has been received from the master client application 165. If no collection request is received, execution of the slave client application 185 returns to box 306. Alternatively, if a collection request is received, execution of the slave client application 185 proceeds to box 318. In box 318, the slave client application 185 collects the capture data 138 from the data store 181 (FIG. 1A) and transmits the capture data 138 to a destination specified by the master client 106 using FTP, HTTP, and/or other data transfer protocols as can be appreciated. Thereafter, this portion of the slave client application 185 ends as shown.

Figure 3B:
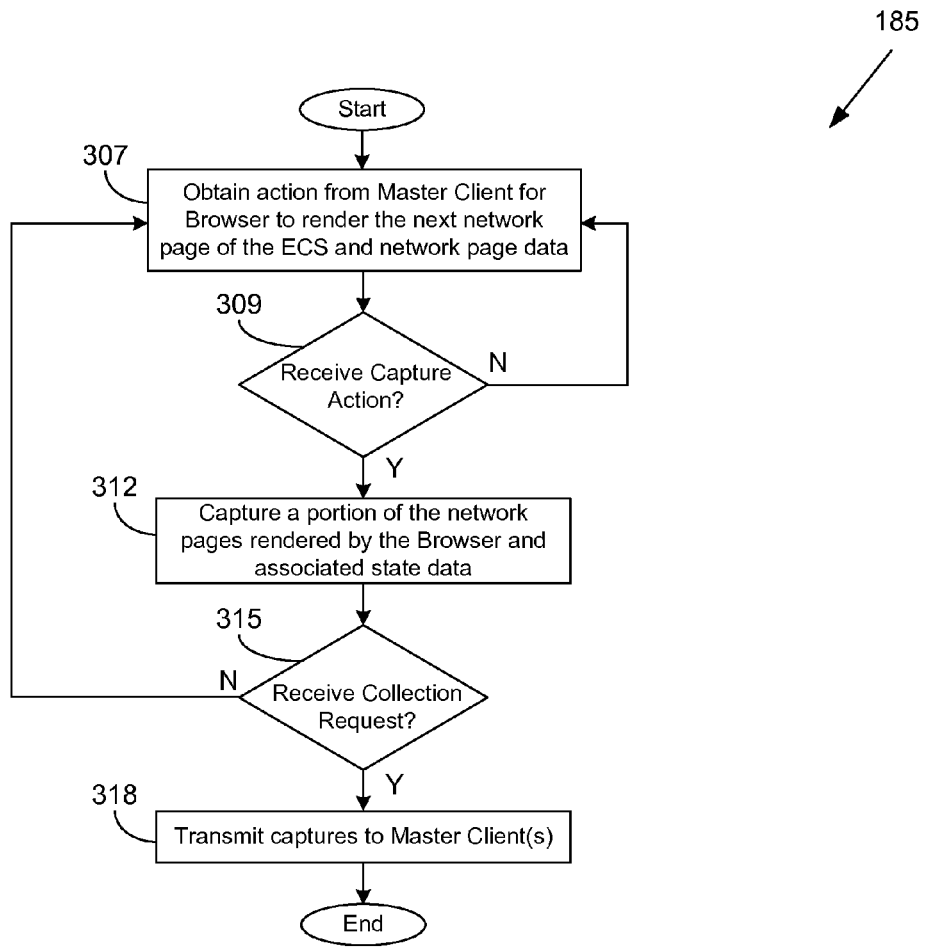

Turning now to FIG. 3B, shown is a flowchart that provides another example of the operation of a portion of the slave client application 185 according to various embodiments. The flowchart of FIG. 3B resembles FIG. 3A with the exception that box 303 is removed and box 306 has been replaced with box 307. In box 307, the slave client application 185 may obtain an action 167 (FIG. 1A) from the master client 106 (FIG. 1A). The action 167 may contain a DOM tree created from the network page by the browser 162 (FIG. 1A), browser session cookies and/or other data sufficient to masquerade or duplicate the communication session between the master client 106 and the electronic commerce system 121 (FIG. 1A)

within each of the slave clients 108 (FIG. 1A) without modifying the state of the communication session established by the master client 106.

Figure 4:
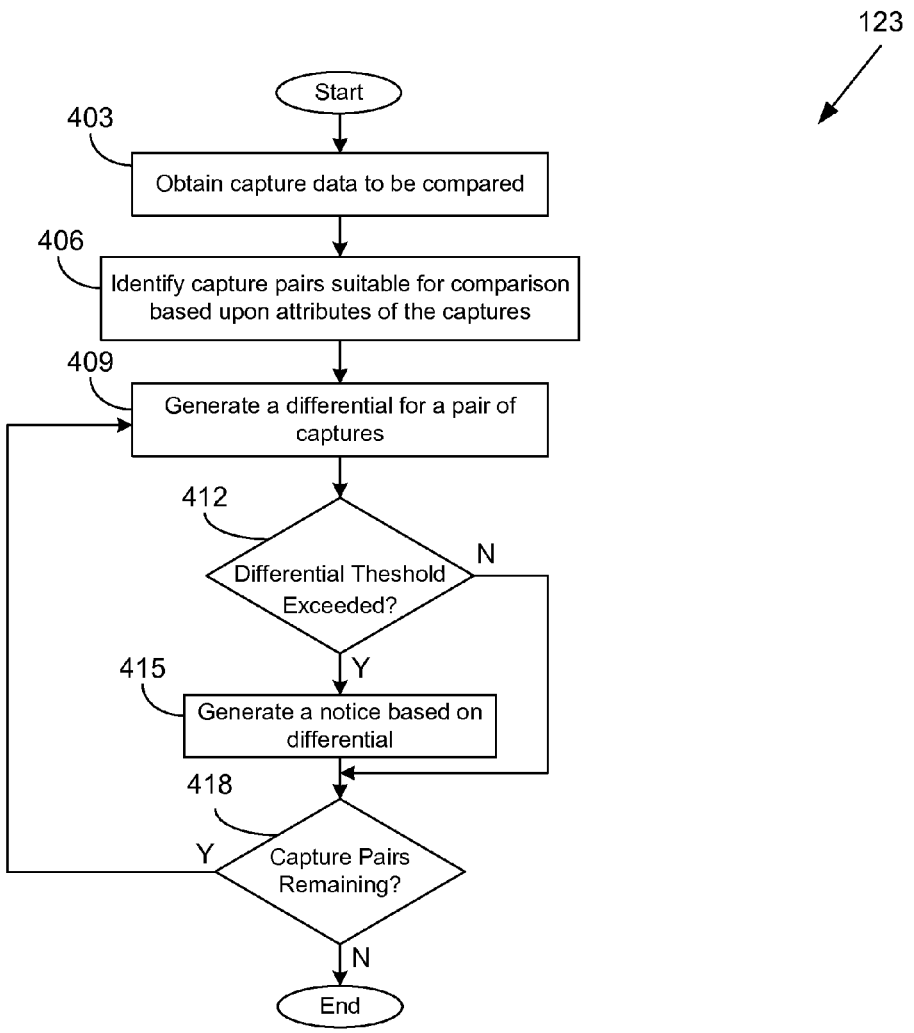
FIG. 4 is a flowchart illustrating examples of functionality implemented as portions of a capture differential engine executed in a computing environment in the networked environments of FIGS. 1A and 1B according to various embodiments of the present disclosure.

Referring next to FIG. 4, shown is a flowchart that provides one example of the operation of a portion of the capture differential engine 123 according to various embodiments. It is understood that the flowchart of FIG. 4 provides merely an example of the many different types of functional arrangements that may be employed to implement the operation of the portion of the capture differential engine 123 as described herein. As an alternative, the flowchart of FIG. 4 may be viewed as depicting an example of steps of a method implemented in the computing environment 103 (FIG. 1A) according to one or more embodiments.

Beginning with box 403, the capture differential engine 123 obtains various criteria with which to select and compare captures. Next, in box 406, the capture differential engine 123 correlates the specified criteria against the attributes for each of the captures as collected by the clients such as, for example, user login state, time of rendering, the URI of the network page, a product identifier of a product in the network page, type of browser 162 (FIG. 1A) used for the rendering, and/or other attributes as can be appreciated. As a result, the capture differential engine 123 identifies pairs of captures having attributes that are correlated to a minimum threshold degree.

Next, in box 409, the capture differential engine 123 may compare the captures using various techniques such as, for example, comparing images of the renderings by performing a pixel-by-pixel comparison identifying the locations in which the pixels of the image differ. The pixel comparison may be further adapted to compare only sub-regions of a rendered page rather than the entirety of the page. As another example, the captures may be compared by measuring differences in the dimensions of the DOM tree created for each capture by a respective browser 162. As a further example, images of the captures may be compared by one or more users who are then asked to identify the degree of similarity between the images. Furthermore, one or more of these techniques may be combined and the results weighted to generate a differential reflecting the degree of similarity among each pair of captures.

Subsequently, in box 412, the capture differential engine 123 determines whether the differential meets a threshold value. If the differential for the capture pair does not meet the threshold value, execution of the capture differential engine 123 proceeds to box 418. Alternatively, if the capture differential meets the threshold, in box 415, the capture differential engine 123 generates a notification of a potential problem with the respective network pages. Next, in box 418, the capture differential engine 123 determines if additional capture pairs exist to be examined. If additional capture pairs do exist, execution of the capture differential engine 123 returns to box 409. Alternatively, if no additional capture pair exists to be examined, execution of this portion of the capture differential engine 123 ends as shown.

Figure 5:
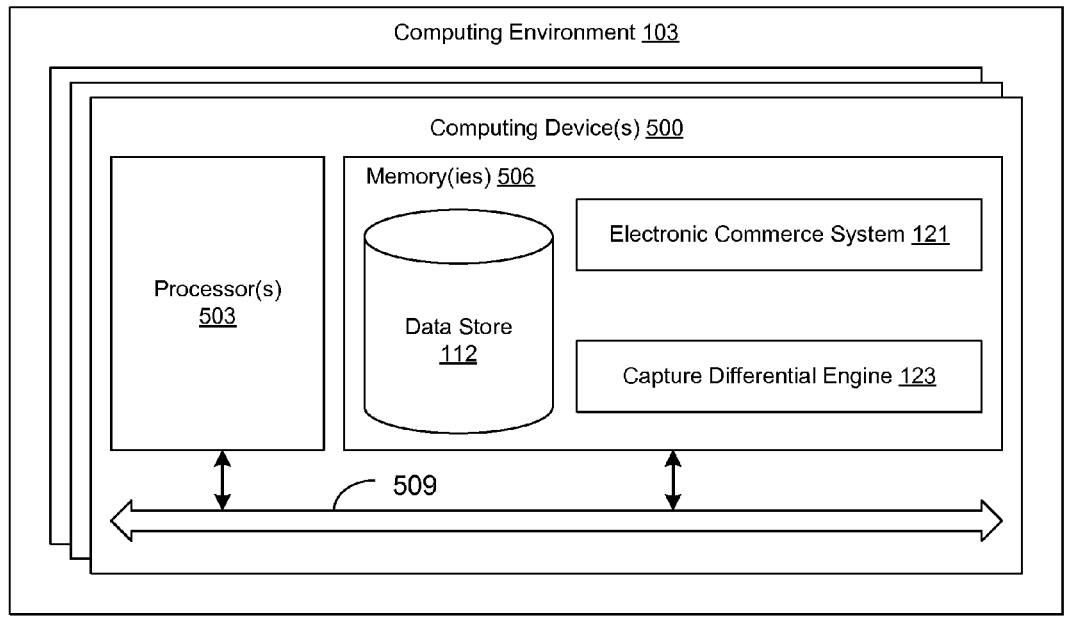
FIG. 5 is a schematic block diagram that provides one example illustration of a computing environment employed in the networked environments of FIGS. 1A and 1B according to various embodiments of the present disclosure.

With reference to FIG. 5, shown is a schematic block diagram of the computing environment 103 according to an embodiment of the present disclosure. The computing environment 103 may comprise one or more computing devices 500. The computing device 500 includes at least one processor circuit, for example, having a processor 503 and a memory 506, all of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the electronic commerce system 121, capture differential engine 123, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1A) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Figure 6:
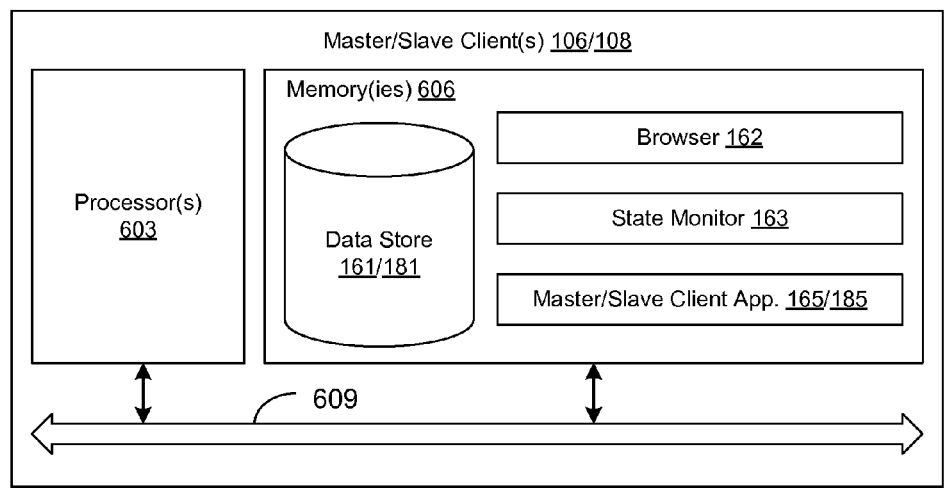
FIG. 6 is a schematic block diagram that provides one example illustration of a client employed in the networked environments of FIGS. 1A and 1B according to various embodiments of the present disclosure.

With reference to FIG. 6, shown is a schematic block diagram of the client 106, 108 according to an embodiment of the present disclosure. The client 106, 108 includes at least one processor circuit, for example, having a processor 603 and a memory 606, both of which are coupled to a local interface 609. To this end, the client 106, 108 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the browser 162, the state monitor 163, the client applications 165, 185, and potentially other applications. Also stored in the memory 606 may be a data store 161, 181 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1A) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the electronic commerce system 121, capture differential engine 123, master client application 165, slave client application 185, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2A-4 show the functionality and operation of an implementation of portions of the master client application 165, slave client application 185, and capture differential engine 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2A-4 show a specific order of execution, it is understood that the order of execution may differ from that which is depicted. For example, the order of execution of two or more blocks may be scrambled relative to the order shown. Also, two or more blocks shown in succession in FIGS. 2A-4 may be executed concurrently or with partial concurrence. Further, in some embodiments, one or more of the blocks shown in FIGS. 2A-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 121, capture differential engine 123, master client application 165, and slave client application 185, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a first computing device, the program when executed, causing the first computing device to at least:

obtain a workflow definition, wherein the workflow definition comprises a sequence of a plurality of actions to be performed by a first browser with a plurality of web pages of an electronic commerce system and capture criteria associated with individual ones of the plurality of actions;

initiate the sequence of the actions between the first browser and the plurality of web pages of the electronic commerce system, wherein the plurality of actions comprise the first browser rendering the plurality of web pages of the electronic commerce system;

transmit, via a network, a plurality of browsing instructions to a second computing device, wherein the plurality of browsing instructions duplicate the actions by the first browser in a second browser in the second computing device;

store, in a first album of a data store, a plurality of first captures of individual ones of a subset of the plurality of web pages rendered by the first browser, the plurality of first captures comprising a plurality document object model (DOM) trees corresponding a rendering by the first browser of a respective one of the subset of the plurality of web pages, wherein individual ones of the subset of the plurality of web pages has a plurality of attributes having a positive degree of correlation with the capture criteria for a respective one of the actions;

transmit, via the network, the plurality of DOM trees and a plurality of capture instructions to the second computing device, wherein the plurality of capture instructions direct the second computing device to store, in a second album, a second capture of the individual ones of the subset of the plurality of web pages rendered by the second browser according to a respective one of the plurality of DOM trees corresponding to the rendering of the respective one of the subset of the plurality of web pages as rendered by the first browser without modifying the respective one of the plurality of DOM trees; and obtain, from the second computing device, the second album of the second capture of the individual ones of the subset of the plurality of web pages.

2. The computer-readable medium of claim 1, wherein one of the plurality of attributes comprises a login state of a user of the electronic commerce system.

3. The computer-readable medium of claim 1, wherein one of the plurality of attributes comprises a uniform resource identifier (URI).

4. A system, comprising:

a first at least one computing device configured to at least:

store a plurality of actions of a first browser, wherein the plurality of actions of the first browser comprise rendering a plurality of network pages of an electronic commerce system, and storing a plurality of captures corresponding to individual ones of a subset of the plurality of network pages and associated attribute data, the plurality of captures comprising a respective document object model (DOM) tree of a rendering by the first browser of a respective one of the subset of the plurality of network pages;

transmit, via a network, the respective DOM tree and a plurality of instructions to a slave client application executable in a client, wherein the plurality of instructions duplicate the actions of the first browser to render the subset of the plurality of network pages in a second browser in the client according to the respective DOM and without modifying the DOM tree; and a second at least one computing device configured to at least:

store a plurality of master requests from the first at least one computing device for the plurality of network pages of the electronic commerce system, along with a plurality of responses from the electronic commerce system corresponding to the plurality of master requests;

obtain a plurality of slave requests from the slave client application for the plurality of network pages of the electronic commerce system, wherein individual ones of the plurality of slave requests correspond to a corresponding one of the plurality of master requests; and transmit one of the plurality of responses stored in the second at least one computing device to the slave client application, wherein the one of the plurality of responses is associated with the corresponding one of the plurality of master requests.

5. The system of claim 4, wherein the first at least one computing device is further configured to obtain, from the client, another capture stored by the slave client application.

6. The system of claim 4, wherein the plurality of captures comprise an image of the rendering and the attributes of the respective one of the subset of the plurality of network pages.

7. The system of claim 4, wherein the plurality of actions of the first browser are directed by a user.

8. The system of claim 4, wherein the attribute data comprises a login state of a user of the electronic commerce system.

9. The system of claim 4, wherein at least some of the plurality of actions of the first browser are defined in a workflow definition.

10. The system of claim 4, wherein the client and the server are virtual machines executing in the first at least one computing device.

11. The system of claim 4, wherein the second browser executes an idem potent operation based on the respective DOM tree.

12. The system of claim 9, wherein the workflow definition comprises criteria for storing the plurality of captures.

13. A method, comprising:
- storing, by a first at least one computing device, a plurality of actions of a first browser, wherein the plurality of actions of the first browser comprise rendering a plurality of network pages of an electronic commerce system, and storing a plurality of captures corresponding to individual ones of a subset of the plurality of network pages and associated attribute data, the plurality of captures comprising a respective document object model (DOM) tree of a rendering by the first browser of a respective one of the subset of the plurality of network pages;
- transmitting, by the first at least one computing device, via a network, the respective DOM tree and a plurality of instructions to a slave client application executable in a client, wherein the plurality of instructions duplicate the actions of the first browser to render the subset of the plurality of network pages in a second browser in the client according to the respective DOM and without modifying the DOM tree;
- storing, by a second at least one computing device, a plurality of master requests from the first at least one computing device for the plurality of network pages of the electronic commerce system, along with a plurality of responses from the electronic commerce system corresponding to the plurality of master requests;
- obtaining, by the second at least one computing device, a plurality of slave requests from the slave client application for the plurality of network pages of the electronic commerce system, wherein individual ones of the plurality of slave requests correspond to a corresponding one of the plurality of master requests; and
- transmitting, by the at least one computing device, one of the plurality of responses stored in the second at least one computing device to the slave client application, wherein the one of the plurality of responses is associated with the corresponding one of the plurality of master requests.

14. The method of claim 13, further comprising obtaining, by the at least one computing device, from the client, another capture stored by the slave client application.

15. The method of claim 13, wherein the plurality of captures comprise an image of the rendering and the attributes of the respective one of the subset of the plurality of network pages.

16. The method of claim 13, wherein the plurality of actions of the first browser are directed by a user.

17. The method of claim 13, wherein the attribute data comprises a login state of a user of the electronic commerce system.

18. The method of claim 13, wherein at least some of the plurality of actions of the first browser are defined in a workflow definition.

19. The method of claim 13, wherein the client and the server are virtual machines executing in the first at least one computing device.

20. The method of claim 18, wherein the workflow definition comprises criteria for storing the plurality of captures.

* * * * *